March 27, 1962 P. B. OLMSTED 3,026,856
VALVE CONTROLLING MECHANISM
Filed May 27, 1960 5 Sheets-Sheet 1

INVENTOR.
Peter B. Olmsted
BY
Barnes, Kisselle & Raisch
ATTORNEYS

March 27, 1962

P. B. OLMSTED 3,026,856

VALVE CONTROLLING MECHANISM

Filed May 27, 1960

INVENTOR.
Peter B. Olmsted
BY
Harness, Dickey & Pierce
ATTORNEYS

March 27, 1962 P. B. OLMSTED 3,026,856
VALVE CONTROLLING MECHANISM
Filed May 27, 1960 5 Sheets-Sheet 3
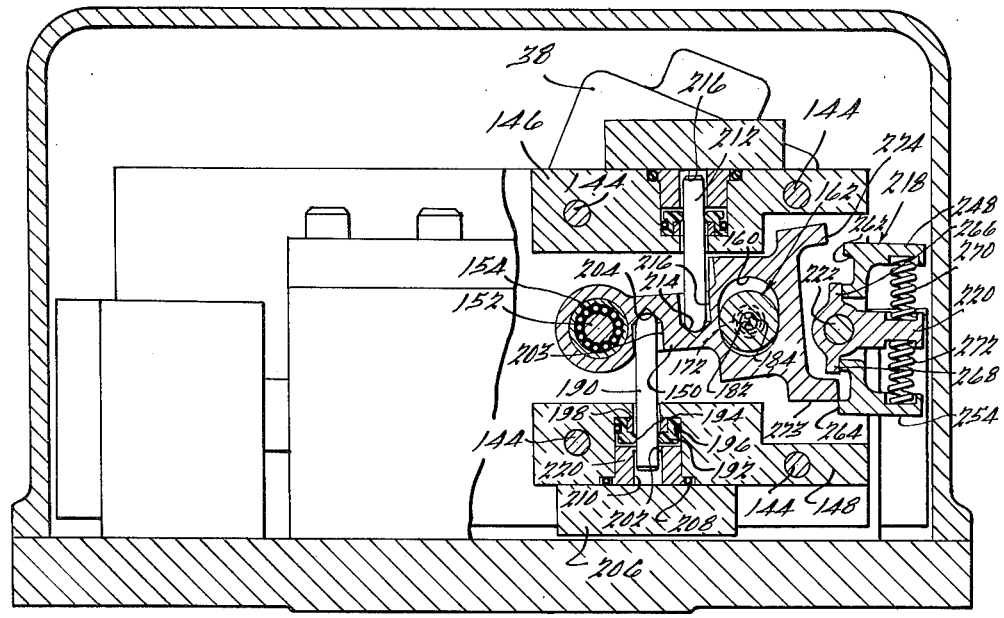
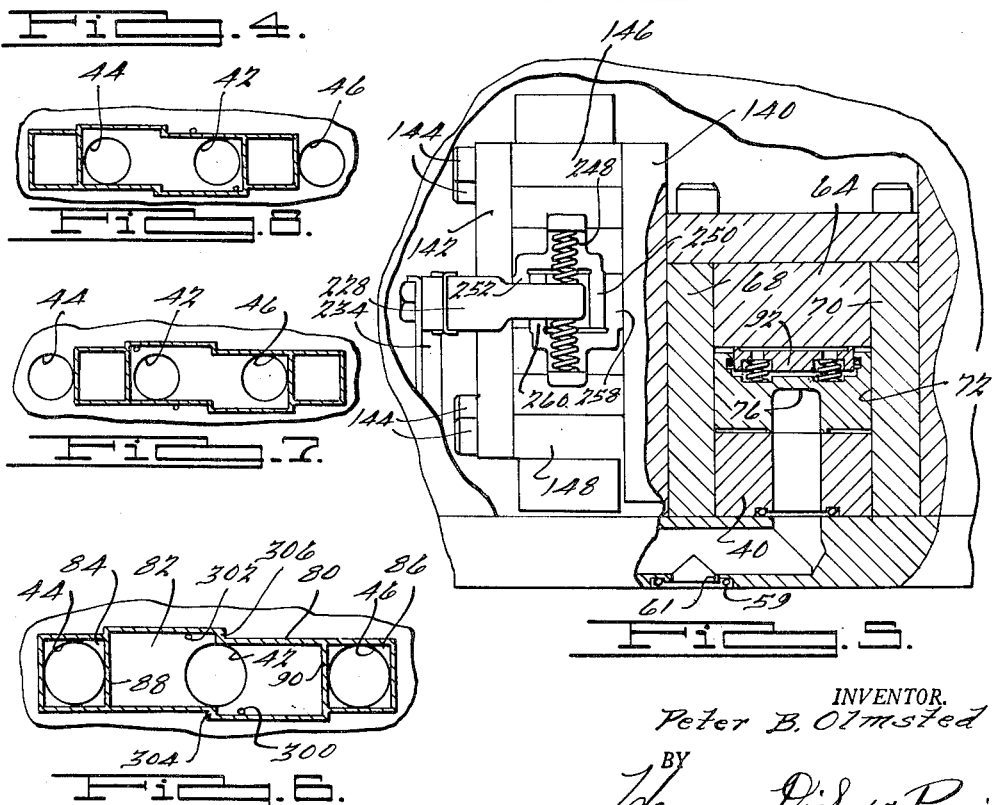
INVENTOR.
Peter B. Olmsted
BY
Harness, Dickey & Pierce.
ATTORNEYS.

March 27, 1962
P. B. OLMSTED
3,026,856
VALVE CONTROLLING MECHANISM
Filed May 27, 1960
5 Sheets-Sheet 4
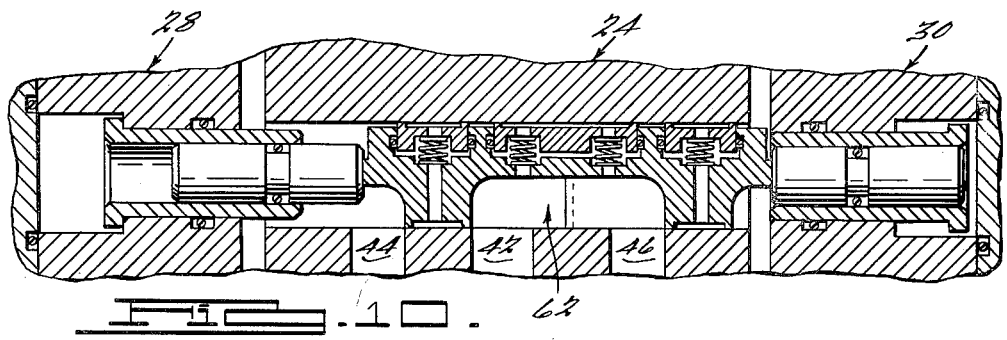
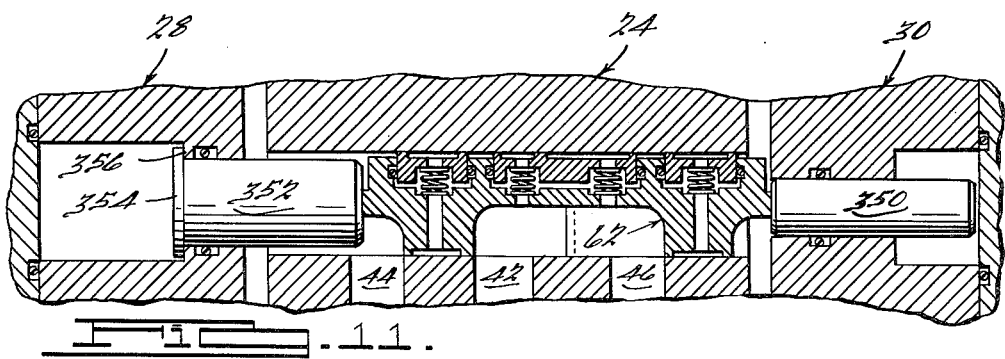
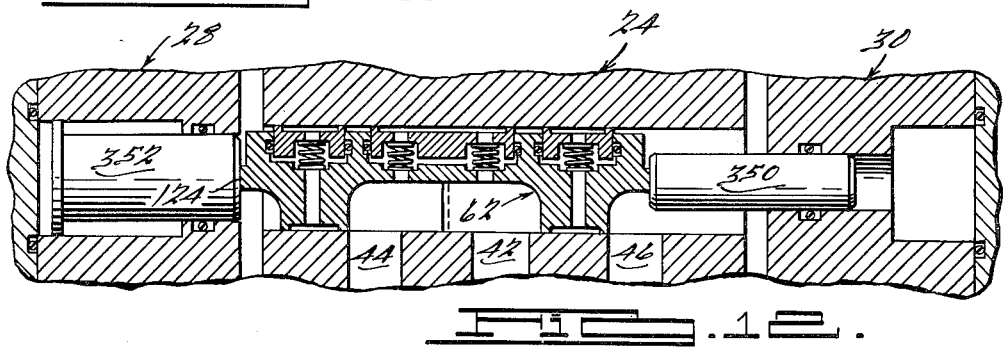
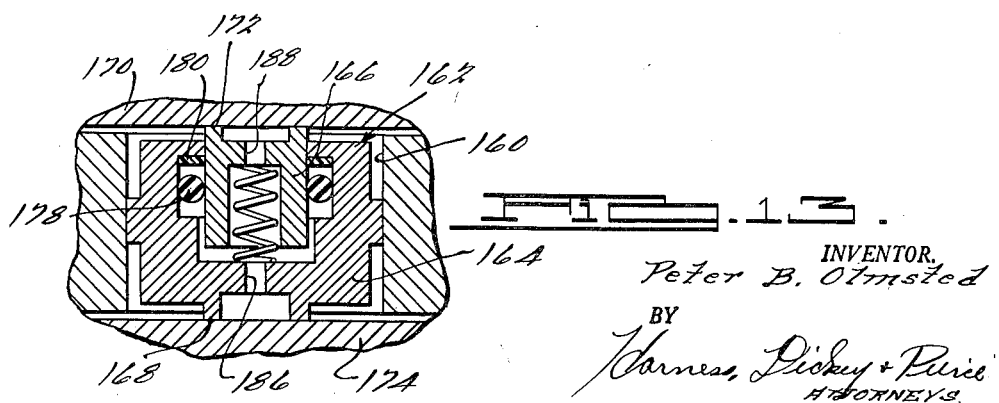
INVENTOR.
Peter B. Olmsted
BY
Harness, Dickey & Pierce
ATTORNEYS

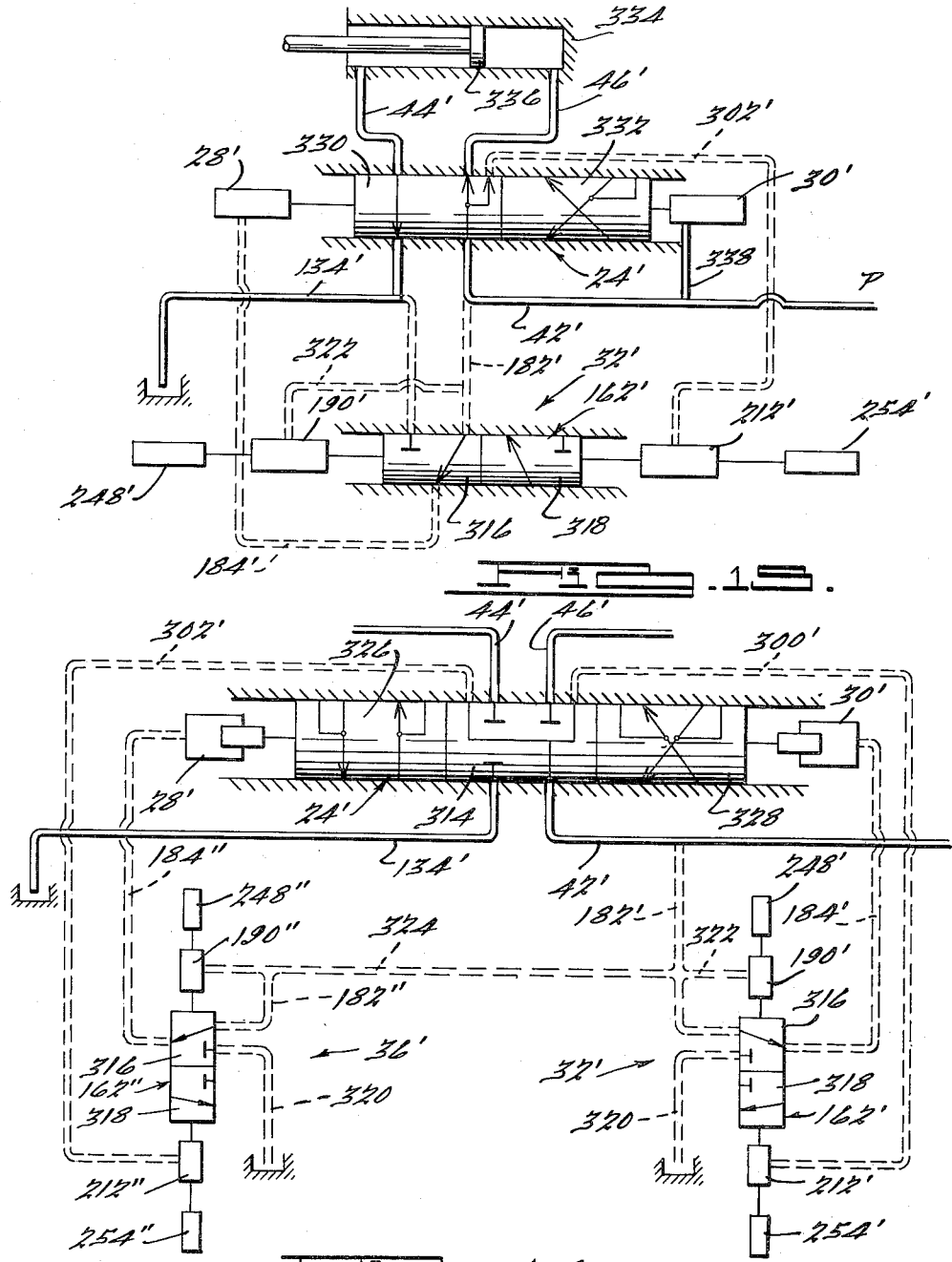

United States Patent Office 3,026,856
Patented Mar. 27, 1962

3,026,856
VALVE CONTROLLING MECHANISM
Peter B. Olmsted, Ann Arbor, Mich., assignor to Double A Products Company, Manchester, Mich., a corporation of Michigan
Filed May 27, 1960, Ser. No. 32,415
17 Claims. (Cl. 121—46.5)

This invention relates to pilot operated valves and particularly to a pilot operated valve for a high pressure system that can be shifted by the application of a very small force.

There are many applications for pilot operated valves in hydraulic systems employing pressures in excess of 3,000 p.s.i. where it is mandatory that the valve can be dependably shifted by a very small force, such as a force obtainable from a small electric solenoid requiring very little electrical power. Guided missiles and submarines in particular have many applications for valves of this type. Of course, in many of these applications there is usually the further requirement that the valve be as leak-tight as possible so that the pressure built up within the system will not be needlessly expended through leakage.

It is one object of the present invention to provide a pilot operated valve that can operate in the presence of fluid pressures in excess of 3,000 p.s.i. with very little, if any, leakage and which can be dependably shifted by a small force of approximately several pounds.

It is another object of the invention to provide a pilot operated valve capable of operating at high fluid pressures wherein the valve shifts hydraulically when a latching mechanism is released by the application of a very small force.

It is a further object of the invention to provide a pilot operated valve capable of operating at high fluid pressures wherein the pilot valve is designed to hydraulically oscillate the spool of a main valve back and forth between predetermined positions, and a latching mechanism is provided to releasably latch the oscillating movement of the main valve at its various positions.

It is a still further object of the invention to provide a pilot operated valve that normally operates to shift the spool of a main valve back and forth in an oscillating manner but is prevented from doing so by a latching mechanism that cooperates with the pilot valve to latch or lock the valve at predetermined positions so that upon release of the latching mechanism the pilot valve will hydraulically shift the main valve until it is latched again by the latching mechanism.

It is a still further object of the invention to provide a pilot operated valve capable of operating at high fluid pressures that can be readily modified to provide a two-position or a three-position valve.

It is a still further object of the invention to provide a pilot operated valve for fluid pressures in excess of 3,000 p.s.i. which is economical to manufacture, rugged and efficient in use, relatively small, compact and light in weight, and easily shifted by a small force.

Other objects and features of novelty of the invention will be specifically pointed out or otherwise become apparent when referring, for a better understanding of the invention, to the following description taken in conjunction with the accompanying drawings wherein:

FIG. 4 is a sectional view taken along the line 4—4 of FIG. 1;

FIG. 5 is a sectional view taken along the line 5—5 of FIG. 1;

FIG. 6 is a fragmentary sectional view taken along the line 6—6 of FIG. 1;

FIG. 7 is a view similar to that of FIG. 6 illustrating a second position of the valve;

FIG. 8 is a view similar to that of FIG. 7 illustrating a third position of the valve;

FIG. 9 is an enlarged fragmentary sectional view of a portion of the structure of FIG. 1 illustrating the latch mechanism thereof in its lowermost position;

FIG. 10 is a fragmentary sectional view of the structure illustrated in FIG. 3 illustrating the sliding block assembly when the valve is in the second position illustrated in FIG. 7;

FIG. 11 is a fragmentary sectional view similar to that of FIG. 10 illustrating the latch valve of the present invention modified to provide a two-position valve;

FIG. 12 is a fragmentary sectional view similar to that of FIG. 11 illustrating a two-position valve with the sliding block assembly shifted to its second position;

FIG. 13 is an enlarged fragmentary sectional view of the seal seat assembly illustrated in FIG. 1;

FIG. 14 is a schematic diagram of a three-position valve embodying features of the present invention, and FIG. 15 is a schematic diagram of a two-position valve embodying features of the present invention.

Figure 1:
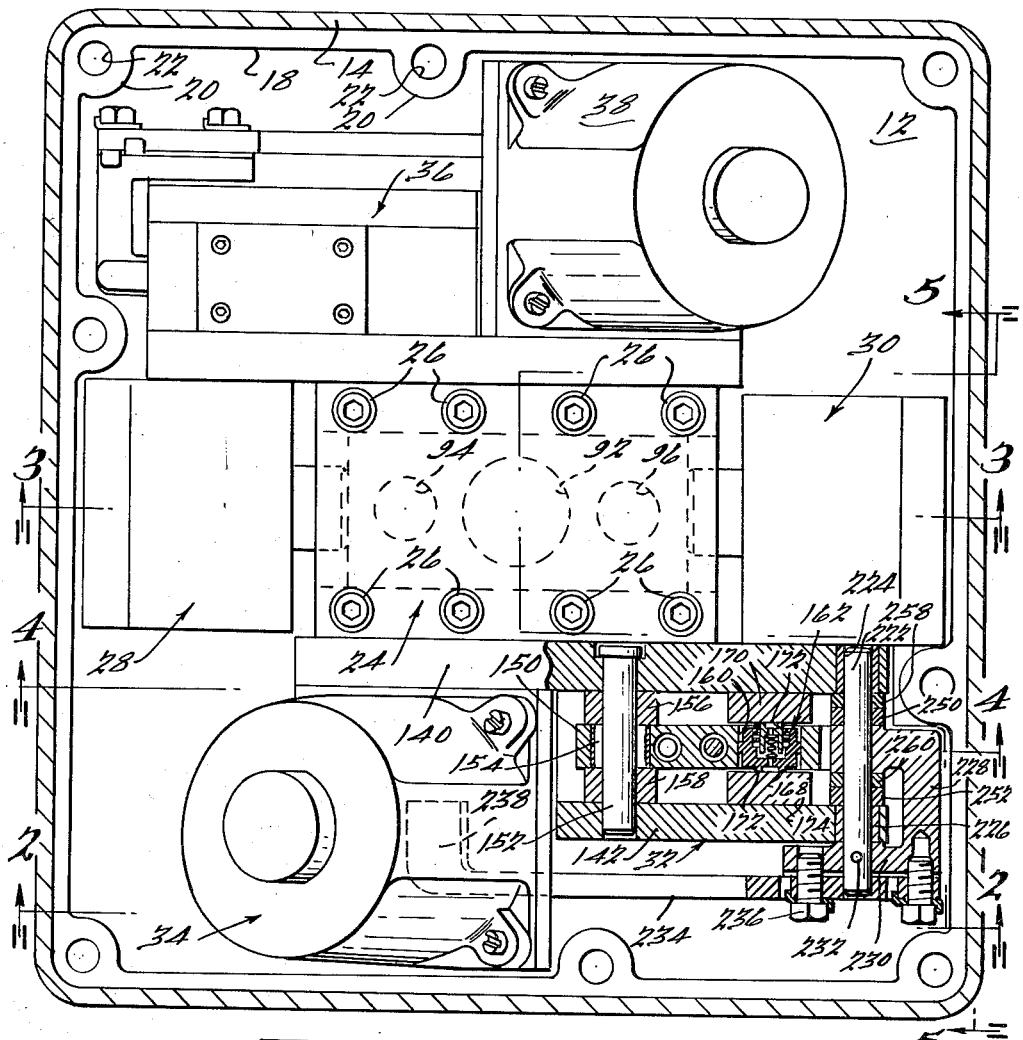
FIGURE 1 is a plan view of a three-position latch valve embodying features of the present invention with the cover thereof shown in section and a portion thereof broken away to more clearly illustrate the latch mechanism.
Figure 2:
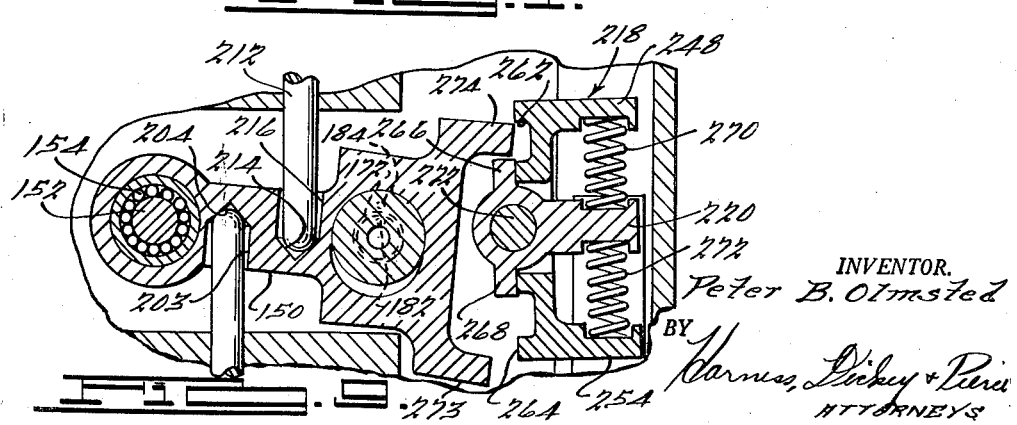
FIG. 2 is an elevational view of the structure illustrated in FIG. 1, with the cover and base plate shown in section to more clearly illustrate the components of the valve enclosed by the cover.
Figure 2:
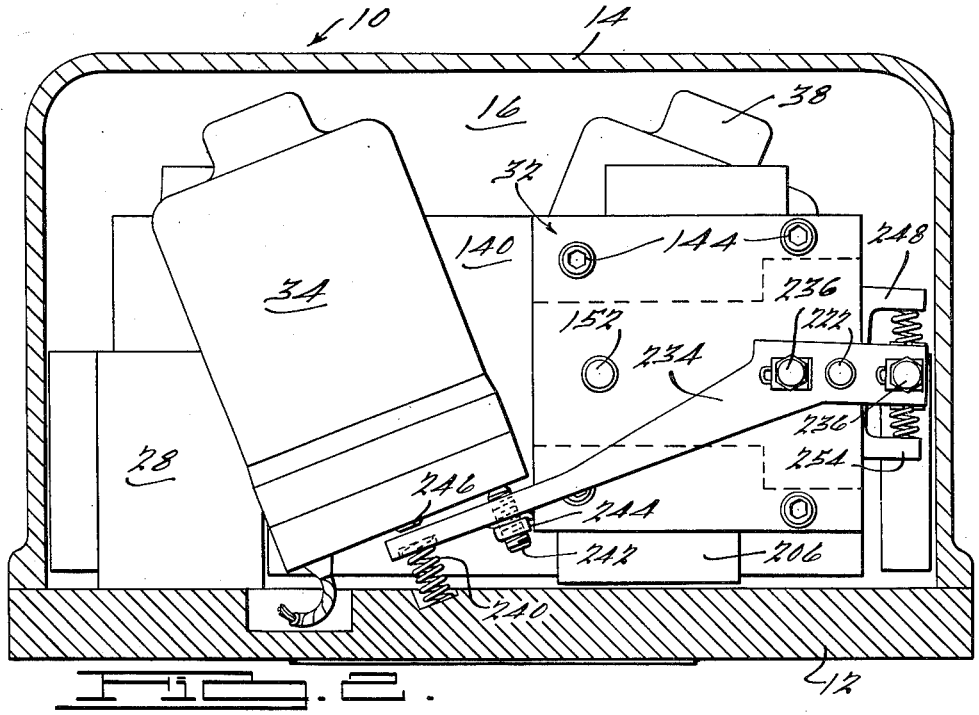

Referring to the drawings and to FIGS. 1 and 2 in particular, a valve 10 embodying features of the present invention is illustrated which is comprised of a base plate 12 having a cover 14 secured thereto in a manner to define an enclosed chamber 16 in which the operating elements of the valve are disposed. The lower periphery of the housing 14 is provided with an inwardly directed flange 18 having a plurality of bosses 20 formed at each of the corners and along the sides thereof to enable the cover to be tightly secured to the base plate 12 in any suitable manner, such as by bolts (not shown) extending through apertures 22 in each of the bosses 20. If desired, a suitable gasket may be disposed between the flange 18 and the base plate to provide a better seal therebetween.

A valve assembly 24 is disposed within the chamber 16 and secured to the base plate 12 by a plurality of bolts 26 extending therethrough along each side thereof. The valve assembly 24 is actuated by two hydraulic cylinders 28 and 30, as will be described in greater detail hereinafter, which are suitably mounted adjacent to each end of the valve assembly. The hydraulic cylinder 30 is controlled by a latch mechanism 32 actuated by a small electric solenoid 34, and the hydraulic cylinder 28 is controlled by an identical latch mechanism 36 and solenoid 38 adjacent to the other side of the valve assembly.

Figure 3:
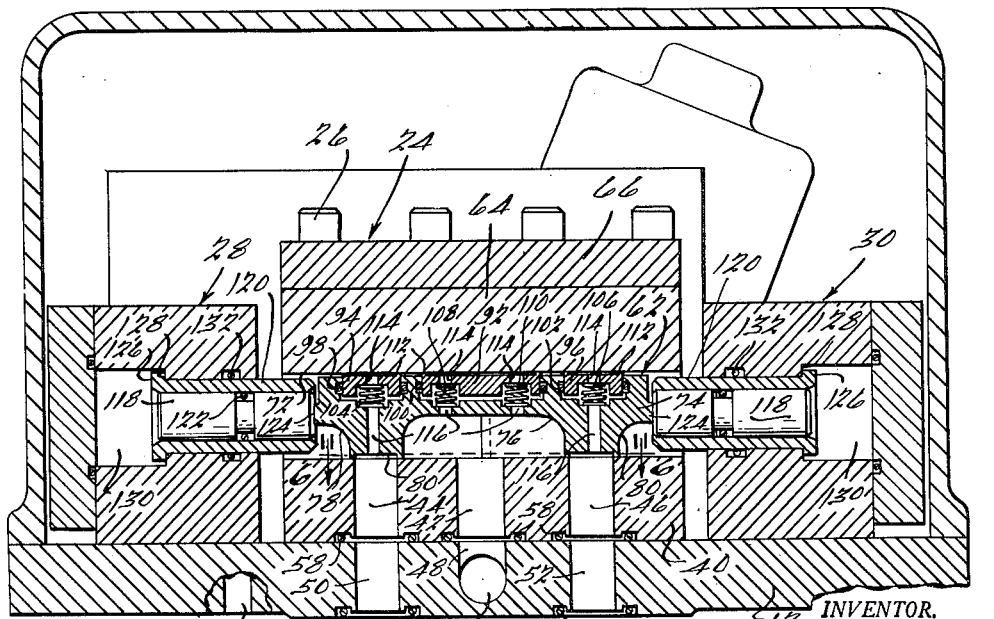
FIG. 3 is a sectional view taken along the line 3—3 of FIG. 1.

Referring to FIGS. 3, 5 and 6, in addition to FIGS. 1 and 2, the valve assembly 24 comprises a subplate 40 having a pressure port 42 and cylinder ports 44 and 46 which are aligned with corresponding ports 48, 50 and 52 in the base plate 12. It will be observed that the cylinder ports 50 and 52 of the base plate extend therethrough so as to communicate with the lower surface thereof, and that suitable O-rings 54 and 56 are provided to ensure a good sealing engagement with the surface of a ported plate or the like on which the valve 10 may be mounted. Similar O-rings 58 are disposed between the subplate 40 and base plate 12 about each of the ports 42, 44 and 46 to seal therebetween. It will also be observed that the pressure port 48 in the base plate communicates with a transverse passageway which in turn communicates with an aperture 61 in the lower surface of the base plate which is surrounded by an O-ring 59 as most clearly illustrated in FIG. 5.

A sliding block assembly 62 is slidably disposed on the upper surface of the subplate 40 and a block 64 is disposed thereabove. A cover plate 66 surmounts the block 64 and rests on two vertical plates 68 and 70 as most clearly illustrated in FIG. 5. The bolts 26 extend through the cover plate 66 and the plates 68 and 70 to secure the entire assembly to the base plate 12 in a manner to enable the sliding block assembly 62 to slide within an aperture 72 defined by the subplate 40, block 64 and side plates 68 and 70.

The sliding block assembly 62 comprises an elongated body 74 having a rectangular cross section as viewed in FIG. 5. The body 74 has a longitudinally extending central recess 76 in the lower face thereof and is also relieved at 78 and 80 along the longitudinal center line at each end thereof. The lower face of the body 74 is coined to provide a downwardly projecting wall 80 having the configuration illustrated in FIG. 6. The lower edge of the wall 80 is carefully finished to enable it to sealingly engage the upper surface of the subplate 40 so that when the sliding block assembly 62 is in the position illustrated in FIGS. 3 and 6, the wall 80 defines three chambers 82, 84 and 86 which seal off the pressure port 42 and cylinder ports 44 and 46, respectively, the transverse wall portions 88 and 90 of the wall 80 preventing communication between each of the ports in the positions illustrated in FIGS. 3 and 6.

To balance the sliding block assembly 62 so that the fluid pressure introduced at the pressure port 42 will not force the body 74 against the lower face of the block 64, and thus increase the force required to shift the sliding block assembly 62, a plurality of circular seats 92, 94 and 96 are slidably sealed by O-rings 98, 100 and 102 in counterbores in the upper surface of the body 74. Suitable springs 104 and 106 are disposed between the body 74 and the seats 94 and 96, respectively, and a pair of springs 108 and 110 are disposed between the larger seat 92 and the body 74 to resiliently urge the wall 80 of the body into sealing engagement with the upper surface of the subplate 40 and to resiliently urge each of the seats upwardly into sealing engagement with the lower face of the block 64. Each of the seats is also provided with upwardly projecting circular projections 112 which are suitably finished to sealingly engage the lower face of the block 64 and define enclosed chambers for balancing the seats. In this regard it will be observed that each of the seats is provided with passageways 116 to enable pressurized fluid to pass therethrough to accomplish the desired balancing. Of course, the areas of the seats and the body exposed to the fluid pressure are suitably proportioned to provide the desired balancing effect.

As most clearly illustrated in FIG. 3 each of the hydraulic cylinders 28 and 30 are provided with a piston 118 slidably sealed within a bushing 120 by an O-ring 122 disposed within an annular groove in the surface of the piston 118. Each of the bushings 120 is in turn slidably sealed within their respective hydraulic cylinders by suitable O-rings 132 or the like. The inner ends of the pistons 118 engage suitable projections 124 on the ends of the body 74, and the outer ends of the bushings 120 have radial flanges 126 thereon which abuttingly engage internal shoulders 128 on the wall of the cylinders 28 and 30 to limit movement of the bushings 120 toward the body 74.

With this construction, pressurized fluid introduced to the chamber 130 of the hydraulic cylinder 28 will shift the piston 118, sliding block assembly 62 and piston and bushing of the cylinder 30 to the right to the position illustrated in FIGS. 7 and 10 when the hydraulic cylinder 30 is connected to tank as will be described. When pressurized fluid at the same pressure is introduced into the chamber 130 of the hydraulic cylinder 30 it will not only act on the area of the right end of the piston 118 thereof, but also on the area of the right end of the bushing 120 to overcome the opposition of the piston 118 of the cylinder 28 and shift the body 74 back to the position illustrated in FIG. 3. At this point, the flange 126 of the bushing 120 of the cylinder 30 engages the shoulder 128 to prevent further movement of the bushing by the pressurized fluid, and the sliding block assembly 62 will remain in the position illustrated in FIG. 3 since the pressurized fluid in each of the chambers 130 acts on the equal areas of the ends of the pistons 118. Similarly, when the cylinder 30 is pressurized and the cylinder 28 is connected to tank, the sliding block assembly 62 is shifted to the position illustrated in FIG. 8. Thus, by slidably disposing the pistons 118 in the slidable bushings 120, the sliding block assembly 62 will always be positioned in the neutral position illustrated in FIG. 3 when fluid at the same pressure is simultaneously introduced in both of the chambers 130, and will be shifted to the right or left when one of the chambers 130 is connected to tank as will be described and the other remains exposed to the pressurized fluid.

It will also be observed in FIG. 3, that the base plate 12 is provided with a tank port 134 which communicates directly with the enclosed chamber 16 defined by the base plate and cover 14. Therefore, when the sliding block assembly 62 is in the position illustrated in FIGS. 3 and 6, it seals off both of the cylinder ports 44 and 46 and the pressure port 42 so that they cannot communicate with one another or with the tank port 134. However, when the sliding block assembly 62 is shifted to the position illustrated in FIGS. 7 and 10, the cylinder port 46 communicates with the pressure port 42 and the cylinder port 44 communicates with the chamber 16 and the tank port 134 since the cylinder port is now disposed outwardly of the left end of the wall portion 80.

Conversely, when the sliding block assembly 62 is shifted to the left to the position illustrated in FIG. 8 the cylinder port 44 communicates with the pressure port 42 and the cylinder port 46 is disposed outwardly of the right end of the wall portion 80 and communicates with the tank port 134.

To shift the sliding block assembly 62 from the neutral position illustrated in FIGS. 3 and 6 to either of the positions illustrated in FIGS. 7 and 8, the latch mechanisms 32 and 36 are provided to control the flow of pressurized fluid into and out of the hydraulic cylinders 30 and 28, respectively. Each of the latch mechanisms are identical in construction and operation and, therefore, only the latch mechanism 32, as most clearly illustrated in FIGS. 1, 2, 4 and 5, will be described in detail. The latch mechanism 32 comprises a plate 140 suitably secured to the side plate 68 of the valve assembly 24 such as by a plurality of bolts (not shown). A second plate 142 is suitably secured to the plate 140 such as by bolts 144, or the like, with upper and lower spacer blocks 146 and 148 disposed therebetween to space the plates apart. An arm 150 is pivotally mounted on a pin 152 extending between the plates 140 and 142 by a needle bearing 154, or the like, and suitable bushings 156 and 158 are disposed about the pin 152 on either side of the arm 150 to position the arm midway between the plates 140 and 142.

An elongated aperture 160 is provided in the right end of the arm 150 and a seal seat assembly 162 is positioned within the aperture 160. The seal seat assembly is comprised of an outer sleeve 164 and an inner sleeve 166. The outer sleeve 164 is provided with an annular projecting seat 168 which slidably seals against a block 174 secured to the side plate 142, and the inner sleeve 166 is provided with a relatively thin circular upper end portion 172 which slidably seals against a block 170 suitably secured to the plate 140. A suitable spring 176 is disposed between the inner and outer sleeves 166 and 164 to urge them apart into sealing engagement with their respective blocks 174 and 170, and a suitable O-ring 178 is disposed between the sleeves to provide a sliding seal therebetween. A Teflon ring 180 may also be provided above the O-ring 178 to prevent the O-ring from being extruded between the inner and outer sleeves by the pressurized fluid which, as will be seen from the following description, acts upwardly on the O-ring 178.

As most clearly illustrated in FIG. 4, the block 170 is provided with two small passageways 182 and 184 which are spaced closely together so that they can both be disposed within the upper end portion 172 of the inner sleeve 166 when the seal seat assembly 162 is in the position illustrated in FIG. 4. The passageway 182 communicates with the pressure port 48 and the passageway 184 communicates with the chamber 130 of the hydraulic cylinder 30. Since the plate 140 is secured directly to both the plate 68 of the valve assembly 24 and the hydraulic cylinder 30, it is apparent that suitable passageways (not shown) can be easily formed in the plate 68, the valve assembly 24 and the hydraulic cylinder 30 to communicate the passageways 182 and 184 with the pressure port 48 and the hydraulic cylinder 30, respectively.

The outer sleeve 164 is provided with a central aperture 186 and the inner sleeve 166 is provided with a radially inwardly projecting shoulder which defines a central aperture 188. This enables the pressurized fluid to enter within the seal seat assembly from the passageway 184 and act on the exposed surfaces thereof to balance the seal seat assembly in a manner to reduce the force required to shift the seal seat assembly. Of course, since the outer sleeve of the seal seat assembly seals against the blank face of the block 174, the pressurized fluid cannot escape beyond the seal seat assembly.

The arm 150 is pivoted in an upward direction, as viewed in FIG. 4, by a piston 190 slidably sealed in the lower block 148 by a Teflon ring 192 having an inwardly projecting lip 194 slidably bearing against the piston 190. An O-ring 196 is disposed between the Teflon ring 192 and the lower spacing block 148 to provide a seal therebetween, and a bushing 198 is positioned beneath the lip 194 to provide support therefor. A larger bushing 200 is fixed within the lower spacing block 148 and has a radially inwardly projecting lip 202 slidably engaging the piston 190 to act as a bearing guide therefor in a manner to minimize binding forces on the piston 190 should it tend to tilt slightly in either direction.

The upper end of the piston 190 projects into a slightly larger bore 203 in the arm 150 and has a rounded nose portion engaging a conical blind end 204 of the bore to enable the piston 190 to reciprocate linearly to pivot the arm 150 without binding. A cap 206 is mounted on the underside of the lower block 148 to close off the lower end of the bushing 200 and an O-ring 208 is disposed between the spacing block 148 and the cap 206 to provide a seal therebetween. The cap 206 cooperates with the bushing 200 to define an enclosed chamber 210 adjacent to the lower end of the piston 190 so that when pressurized fluid is introduced therein, as will be described, the piston 190 will be forced upwardly to pivot the arm 150 in a counterclockwise direction. As illustrated in FIG. 4, the arm 150 is almost but not quite in its uppermost position.

A second piston 212 is similarly mounted in the upper block 146, and has a rounded lower end portion engaging a conical blind end 214 of a bore 215 in the arm 150 at a point disposed radially outwardly of the piston 190. Consequently, when pressurized fluid is introduced into a chamber 216 adjacent to the upper end of the piston 212, as will be described, the piston 212 will pivot the arm 150 downwardly in a clockwise direction even though the lower end of the piston 190 may be exposed to the same fluid pressure since the piston 212 has a longer moment arm.

FIG. 9 illustrates the position of the arm 150 after it has been pivoted to its lowermost position by the piston 212. In this position, the seal seat assembly 162 is shifted in a counterclockwise direction to a position wherein the upper end portion 172 of the inner sleeve is positioned directly between the passageways 182 and 184 and completely encircles the passageway 182 to seal off the pressurized fluid so that it cannot pass into the passageway 184 and thence into the hydraulic cylinder 30 as previously described. It is further apparent that when the passageway 184 lies outside the upper end portion 172 of the inner sleeve 166, it communicates directly with the chamber 16 and, therefore, communicates directly with the tank port 134. Consequently, when the seal seat assembly is shifted to the position illustrated in FIG. 9, the hydraulic cylinder 30 is connected to tank.

As will be described in greater detail hereinafter, pressurized fluid is alternately introduced into the chamber 216 adjacent to the end of the piston 212, and continuously introduced into the chamber 210 adjacent to the piston 190 in a manner to continuously pivot the arm 150 first in one direction and then the other. However, this movement is automatically latched or stopped by a latch assembly 218 when the seal seat assembly 162 is in either of the two positions illustrated in FIGS. 4 and 9. Referring to FIGS. 1, 2 and 9, the latch assembly 218 is operated by the electric solenoid 34 and comprises a member 220 pivotally mounted on a shaft 222 journaled in the plates 140 and 142 by bushings 224 and 226, respectively. The member 220 has a portion 228 thereof extending laterally therefrom which terminates in a right-angled portion 230 which is also pivotally secured to the shaft 222 and keyed thereto by a pin 232, or the like.

One end of an arm 234 is fitted over the end of the shaft 222 and secured directly to the right-angled portion 230 by bolts 236, or the like, so that pivotal movement of the arm 234 will pivot the member 220 on the shaft 222. The left end of the arm 234 angles downwardly, as viewed in FIG. 2, beneath the solenoid 34, and terminates in an enlarged end portion 238 illustrated in dotted lines in FIG. 1. Referring again to FIG. 2, a suitable spring 240 is disposed between the base plate 12 and the end portion 238 to resiliently bias the arm 234 in a clockwise direction. A suitable stud 242 and lock nut 244 are provided for varying the space between the end portion 238 and the bottom of the solenoid 34 for varying the point at which the lower end of a plunger 246 of the solenoid engages the end portion 238. This, of course, varies the angle through which the plunger 246 will pivot the arm 234. The spring 240 is preferably a very light duty spring which exerts only a pound or two of force to normally maintain the arm 234 in the position illustrated in FIG. 2 without offering much resistance to the pivoting of the arm in a counterclockwise direction by the downward movement of the plunger 246 of the solenoid.

Referring particularly to FIGS. 1, 4 and 5, an upper latch element 248 is pivotally mounted on the shaft 222 by downwardly extending arms 250 and 252 thereof, and a similar lower latch element 254 is pivotally mounted on the shaft 222 by upwardly extending arms 258 and 260 thereof. The arms of each of the latch elements also serve as spacers to center the member 220 therebetween. As most clearly illustrated in FIG. 4, the upper and lower latch elements are provided with flanges 262 and 264, respectively, and the member 220 is provided with projecting ears 266 and 268 which engage the upper and lower elements 248 and 254, respectively, to limit relative pivotal movement of the latch element 248 in a counterclockwise direction and the latch element 254 in a clockwise direction. Suitable springs 270 and 272 are disposed between the member 220 and the upper and lower latch elements, respectively, to normally resiliently urge the latch elements into engagement with the ears 266 and 268.

With this construction, the solenoid 34 can be actuated to pivot the arm 234 in a counterclockwise direction as viewed in FIG. 4 to disengage the flange 264 of the lower latch element from a flange 273 on the lower right corner of the arm 150 to enable the piston 212 to pivot the arm 150 in a clockwise direction. The solenoid 34 pivots the latch member 220 far enough to bring the flange 262 of the upper latch element into abutting engagement with the end of a flange 274 on the upper right corner of the arm 150 and compress the spring 270 which permits the member 220 to pivot relative to the upper latch element 248. The flanges 262 and 274 are oriented in a manner to make certain that the flange 262 cannot slip beneath the flange 274 to prevent the clockwise movement of the arm 150.

As soon as the arm 150 pivots a sufficient distance to bring the upper semicircular wall of the aperture 160 therein into engagement with the outer sleeve 164 of the seal seat assembly, it begins to shift the seal seat assembly 162. Since the flange 262 of the upper latch element 248 is biased in a counterclockwise direction by the spring 270 when it is compressed, the flange 262 will slip over the flange 274 as soon as the arm 150 pivots a sufficient distance to clear the flanges. The arm 150 then continues to pivot a small distance to accurately position the seal seat assembly in the position illustrated in FIG. 9 wherein it completely seals off the passageway 182 from the passageway 184. At this point, the chamber 216 adjacent to the piston 212 is communicated with tank, in a manner to be described in greater detail hereinafter, to enable the piston 190 to take over and begin to pivot the arm 150 in a counterclockwise direction. However, since the flange 262 now overlies the flange 274 the upper element 218 will latch the arm 150 against further pivotal movement as soon as the flanges engage.

Conversely, when the solenoid 34 is deenergized the arm 234 will be pivoted in a clockwise direction by the spring 240 to disengage the flange 262 from the flange 274 and immediately move the flange 264 into abutting engagement with the end of the flange 273 in a manner to compress the spring 272 to make certain that the lower latch element 254 will slip under the flange 273 as soon as it moves past. As will be observed in both FIGS. 4 and 9, the aperture 160 is elongated to permit the velocity of the arm to build up before the seal seat assembly 162 is engaged so that the seal seat assembly will be quickly shifted between the positions illustrated in FIGS. 4 and 9. This also enables the arm 150 to strike the seal seat assembly with an impact to start it moving in a manner to reduce the force required to shift the seal seat assembly. However, in view of the very small area of the upper end portion 172 of the inner sleeve in engagement with the lower block 174 and small area of the circular seat 168 on the lower end of the outer sleeve in engagement with the upper block 170, and further in view of the hydraulic balancing of the seal seat assembly to minimize the seating forces, it does not take a very large force to shift the seal seat assembly. Still further, since the shifting force is provided by the presurized fluid acting on the upper and lower ends of the pistons 212 and 190, respectively, a sufficient shifting force is always available for dependably shifting the seal seat assembly. It will also be observed that the solenoid 34 need only provide a force of a few pounds in addition to that necessary to overcome the resistance of the spring 240 which, as previously mentioned, is deliberately made very small. The reason for this is that the additional force only has to be great enough to overcome the small amount of friction between the latching flanges 267 and 274, and 264 and 273.

The latching mechanism 36 is identical to the latching mechanism 32 and shifts a seal seat assembly identical to the seal seat assembly 162 to introduce pressurized fluid to the hydraulic cylinder 28 in one position and to connect the hydraulic cylinder to tank in the other position. When the solenoid 34 is deenergized it is in the position illustrated in FIG. 2 and the seal seat assembly 162 is in the position illustrated in FIG. 4 so that the passageways 182 and 184 communicate with one another to introduce pressurized fluid into the hydraulic cylinder 30. Similarly, when the solenoid 38 is deenergized it will also introduce pressurized fluid into the hydraulic cylinder 28 so that the sliding block assembly 62 will be positioned in its neutral position as illustrated in FIGS. 3 and 6. When the solenoid 34 is energized, it pivots the latch assembly 218 to release the arm 150 so that the piston 212 can pivot the arm in a clockwise direction, as viewed in FIG. 4, to shift the seal seat assembly 162 to the position illustrated in FIG. 9 which communicates the hydraulic cylinder 30 with tank. Since the hydraulic cylinder 28 is still pressurized, it will shift the sliding block assembly 62 to the right to the position illustrated in FIGS. 7 and 10. When the sliding block assembly is shifted to this position, it communicates the cylinder port 44 with the tank port 134, and communicates the cylinder port 46 with the pressure port 42. Of course, when the solenoid 34 is deenergized the seal seat assembly will shift again to communicate the passageways 182 and 184 with one another to again introduce pressurized fluid into the hydraulic cylinder 30 and return the sliding block assembly 62 back to the position illustrated in FIGS. 3 and 6. Similarly, when the solenoid 38 is energized it will communicate the hydraulic cylinder 28 with tank to enable the hydraulic cylinder 30 to shift the sliding block assembly 62 to the left to the position illustrated in FIG. 8 wherein the cylinder port 44 communicates with the pressure port 42 and the cylinder port 46 communicates with the tank port 134.

To enable the latch valve 10 to operate in this manner the arm 150 of each of the latch mechanisms 32 and 36 must be continuously pivoted back and forth by the pistons 190 and 212 to enable the latch assembly 218 to latch the arm 150 after the seal seat assembly 162 has been shifted to either of its two positions. This, in turn, enables the pivoting movement of the arm 150 to be controlled by the release of the latch mechanisms 32 and 36 by their respective solenoids. Referring specifically to the latch mechanism 32, the operation of the latch mechanism 36 being identical as previously mentioned, the continuous pivoting of the arm 150 is accomplished by communicating the chamber 210 adjacent the lower end of the piston 190 directly to the pressure port 42 at all times by suitable passageways (not shown). Then by alternately communicating the chamber 216 adjacent to the upper end of the piston 212 with tank and with the source of pressurized fluid when it is not communicated with tank, the arm 150 can be made to continuously oscillate back and forth except when it is prevented from doing so by the latch assembly 218.

To introduce pressurized fluid to the chamber 216, a small passageway 300 is formed in the subplate 40 in the position illustrated in FIG. 6 wherein it is enclosed by the wall portion 80, and, therefore, communicates directly with the pressure port 42. The passageway 300, of course, communicates with the chamber 216 by suitable passageways (not shown.) A similar passageway 302 is provided in the subplate 40 on the diametrically opposite side of the pressure port 42. This passageway communicates the pressure port 42 with the chamber of the latch mechanism 36 corresponding to the chamber 216 of the latch mechanism 32, the other chamber of the latch mechanism 36 corresponding to the chamber 210 communicating directly with the pressure port 42 at all times.

It will also be observed in FIG. 6 that the wall portion 80 is provided with offset portions 304 and 306 adjacent to the passageways 300 and 302, respectively, so that when the sliding block assembly 62 is shifted to the position illustrated in FIG. 7, the passageway 300 lies outside the wall portion 80 and, therefore, communicates directly with the tank port 134. In this position, it will be noted that the passageway 302 still communicates directly with the pressure port 42. However, when the sliding block assembly 62 is shifted to the left, the reverse is true. The passageway 302 lies outside the wall portion 80 and communicates directly with the tank port 134, and the passageway 300 remains within the wall portion 80 and communicates directly with the pressure port 42. From this it is apparent that when the sliding block assembly is in the neutral position illustrated in FIGS. 3 and 6, pressurized fluid is introduced directly into the chamber 216 of each of the latch mechanisms 32 and 36 which tends to pivot the arm 150 in a clockwise direction, as illustrated in FIG. 4. However, the flange 264 of the latch assembly 218 overlaps the flange 213 of the arm 150 to prevent clockwise pivotal movement. Therefore, each of the latch mechanisms 32 and 36 is in effect cocked and ready to be released by simply energizing either the solenoid 34 or the solenoid 38.

Assuming that the solenoid 34 is energized, the arm 150 of the latch mechanism 32 is released which, as previously described, shifts the sliding block assembly 62 to the position illustrated in FIGS. 7 and 9. The passageway 300 will continue to communicate with the pressure port 42 during part of the shifting of the sliding block assembly to continue to introduce pressurized fluid into the chamber 216. When the seal seat assembly 162 is accurately positioned as illustrated in FIG. 9 so as to interrupt communication between the passageways 182 and 184, the passageway 300 will pass beyond the offset portion 304 of the wall portion 80 to communicate the chamber 216 with the tank port 134. This enables the piston 190 to immediately begin to pivot the arm 150 in the opposite direction since, as previously mentioned, pressurized fluid is always introduced into the chamber 210 adjacent to the lower end of the piston 190.

Of course, the latch assembly 218 will engage the flange 274 to halt the counterclockwise pivoting of the arm 150 by the piston 190 as soon as the clearance between the flanges 262 and 274 is taken up. The elongation of the aperture 160 in the arm 150 enables this clearance to be taken up without shifting the seal seat assembly. Consequently, the latch assembly is again cocked and as soon as the solenoid 34 is deenergized the latch assembly will release the arm 150 so that it will be pivoted in a counterclockwise direction by the piston 190 to shift the seal seat assembly 162 back to the position illustrated in FIG. 4. When the seal seat assembly has reached this position wherein the passageway 182 again communicates with the passageway 194, the sliding block assembly 62 will shift to the left back to the neutral position illustrated in FIG. 6, as previously described. This again communicates the passageway 300 with the pressure port 42 so that the piston 212 takes over by virtue of its longer moment arm to reverse the pivotal movement of the arm 150 until the flange 273 engages the flange 264 of the lower latch element 254. It might also be noted at this point that in the position illustrated in FIG. 4, the arm 150 has shifted the seal seat assembly 162 to its final position and pressurized fluid has already been introduced into the chamber 216 so that the piston 212 has begun to pivot the arm 150 in a counterclockwise direction, which pivotal movement is halted by the flange 264 which had previously slipped beneath the flange 273. This accounts for the slight space between the lower portion of the seal seat assembly 162 and the wall of the aperture 160.

The spacing of the passageway 300 from the offset portion 304, and the spacing of the passageway 302 from the offset portion 306 provides an appropriate time lag between the time the passageways 182 and 184 begin to communicate with one another (or are prevented from communicating with one another) by the shifting of seal seat assembly 162, and the time at which the direction of pivotal movement of the pivoting arm 150 is reversed. It is apparent that the passageways 300 and 302 preferably should not be disposed immediately adjacent to the offset portions 304 and 306. Using the passageway 300 as an example, if this were done, pressurized fluid would be immediately cut off from the chamber 216 as soon as the sliding block assembly 62 beings to shift to the right in response to a partial uncovering of the passageway 184. This might leave the seal seat assembly 162 in this partially uncovered position, and would also result in the passageway 300 being positioned outside of the wall portion 80 in communication with the tank port 134 for too long a period during the shifting of the sliding block assembly 62 to the left as viewed in FIG. 8.

To summarize the overall operation of the three-position latch valve, reference is made to the schematic diagram of FIG. 14 wherein each of the valve elements has been indicated schematically and designated by priming numbers previously used to designate the elements. For example, the hydraulic cylinder 28 is indicated schematically by the numeral 28' and the hydraulic cylinder 30 by the numeral 30'. Wherever practical, this scheme has been employed in FIG. 14, and FIG. 15 as well.

In FIG. 14 the sliding valve assembly 24' is illustrated in its neutral position 314 wherein the cylinder ports 44' and 46' are sealed off and the passageways 300' and 302' communicate directly with the pressure port 42'. The tank port 134' is also sealed off in this neutral position 314. With the valve assembly 24' in the neutral position 314, the seal seat assembly 162' of the latch mechanism 32' would be in the position indicated by the numeral 316 wherein the passageway 182' communicates with the passageway 184', and both passageways are sealed off from tank. In this position, the piston 212' of course communicates with the pressure port 42' by means of the passageway 300' as illustrated, and the lower latch element 254' of the latch assembly 218 is in latching position to prevent the seal seat assembly from shifting from the position 316 to a position 318 wherein the passageway 182' would be sealed off and the passageway 184' would communicate with tank as indicated schematically by the line designated by the numeral 320. The piston 190' is connected directly to the passageway 182' by a passageway 322 so that it is exposed to pressurized fluid at all times.

Similarly, the seal seat assembly of the latch mechanism 36' would also be in the position 316 wherein the passageway 182'' thereof communicates with the passageway 184'', the valve elements of the latch mechanism 36' corresponding to those of the latch mechanism 32 being designated by the double primes. The piston 190'' is indicated as continuously pressurized by means of a passageway 324 which also connects the passageway 182' with the passageway 182''. The piston 212'' communicates with the pressure port 42' by the passageway 302' and the lower latch element 254'' is in latching position to prevent the seal seat assembly from shifting from the position 316 to the position 318. Thus, as illustrated in FIG. 10, each of the cylinders 28' and 30' is pressurized and, therefore, the valve assembly 24' is in the neutral position 314.

When the lower element 254' of the latch mechanism 32' is released by energizing the solenoid 34, as previously described, the seal seat assembly 162' shifts to the position 318 wherein the hydraulic cylinder 30' is communicated directly with tank. This, of course, enables the hydraulic cylinder 28' to shift the valve assembly 24' to the right to its second position indicated by the numeral 326 wherein the cylinder port 46' communicates with the pressure port 42', the cylinder port 44' with the tank port 134', the passageway 302' communicates with the tank port 134' and the passageway 300' communicates with the pressure port 42'. Of course, the valve assembly can be shifted back to the neutral position 314 by deenergizing the solenoid 34 to release the upper latch element 248' which returns the seal seat assembly to the position 316 as illustrated.

Similarly, when the solenoid 38 is energized with the valve assembly 24' in the neutral position 314, the seal seat assembly 162'' of the latch mechanism 36' is shifted to the position 318 which communicates the hydraulic cylinder 28' with tank to enable hydraulic cylinder 30' to shift the valve assembly 24' to the extreme left to its third position indicated by the numeral 328. This communicates the cylinder port 44' with the pressure port 42', the cylinder port 46' with the tank port 134', the passageway 302' with the pressure port 42' and the passageway 300' with the tank port 134'. When the solenoid 38 is deenergized the upper element 248" of the latch mechanism 36' is released to enable the piston 190" to return the seal seat assembly 162" to the position 316.

As mentioned previously, the latch valve 10 of the present invention can also be easily modified to operate as a two-position valve as illustrated schematically in FIG. 15 wherein only one of the latch mechanisms is employed and the valve assembly 24' operates between the two positions indicated by the numerals 330 and 332, the latch mechanism 36' being used as illustrated in FIG. 15. When in the position 330 the cylinder port 44' is connected directly to the tank port 134' and the cylinder port 46' is connected directly to the pressure port 42', the cylinder ports being schematically illustrated as connected to a hydraulic cylinder 334 on opposite sides of a piston 336 to shift the piston back and forth. Since only one latch mechanism need be used when the valve 10 of the present invention is used as a two-position valve, only the passageway 302' is used to communicate the piston 212" with the pressure port 42' when the valve assembly 24' is in the position 330. The seal seat assembly 162" of the latch mechanism 36' is in the position 316 wherein the passageway 182" communicates with the passageway 184" to pressurize the hydraulic cylinder 28.

In the two-position valve construction, the hydraulic cylinder 30' is continuously pressurized as indicated by the passageway 330, and the piston 190" is also continuously communicated with the pressurized fluid by the passageway 322 which is connected to the pressure port 42' by the passageway 182', and the piston 212' is selectively communicated with tank or pressure to shift the piston 336 to the right or left. As illustrated in FIG. 15 the piston 212" is also exposed to the pressurized fluid by the passageway 302' since the valve assembly 24' is in the position 330 and, of course, the lower element 254" of the latch mechanism is engaged to prevent the piston 212' from shifting the seal seat assembly 162" to the position 318 until the solenoid 34 is energized.

When the solenoid 38 is energized the seal seat assembly 162" shifts to the position 318 to communicate the hydraulic cylinder 28' with tank and enable the hydraulic cylinder 30', which in the two-position valve is always exposed to pressurized fluid by the passageway 338, to shift the valve assembly 24' to the left to its second position indicated by the numeral 332. In this second position, the pressure port 42' communicates with the cylinder port 44', and the cylinder port 46' and passageway 302' communicate with the tank port 134'. When the valve assembly 24' shifts far enough to communicate the passageway 302' with the tank port 134', the piston 212" will be connected to tank and the piston 190", which is continuously exposed to pressurized fluid, will begin to shift the seal seat assembly 162" back toward the position 316, but will be prevented from doing so by the upper element 248" of the latch mechanism. As soon as the upper element 248" is released by deenergizing the solenoid 38, the seal seat assembly will be shifted back to the position 318 by the piston 190".

Referring to FIGS. 11 and 12, when the valve of the present invention is modified to operate as a two-position valve as schematically illustrated in FIG. 15, single pistons 350 and 352 are used in place of the slidable bushing and piston assemblies used in the three-position valve as previously described. It will be observed that the piston 350 has a smaller diameter than the piston 352 so that when both hydraulic cylinders 28 and 30 are pressurized, the piston 352 will overcome the piston 350 and shift the sliding block assembly 62 to the right to the position illustrated in FIG. 11. A flange 354 on the left end of the piston 352 engages an internal shoulder 356 of the hydraulic cylinder 28 to limit the movement of the sliding block assembly 62 to the right.

When the solenoid 38 is energized, the hydraulic cylinder 28 is connected to tank as previously described in connection with the schematic diagram of FIG. 15. Consequently, the piston 350, which is continuously exposed to pressurized fluid, will take over and shift the sliding block assembly 62 to the left to the position illustrated in FIG. 12, the sliding movement terminating when the projection 124 on the left end of the sliding block assembly engages the right face of the hydraulic cylinder 28. Of course, as illustrated in FIG. 11, the valve assembly 24 is in a position corresponding to the position 330 illustrated in FIG. 15, and the position illustrated in FIG. 7. Likewise, as illustrated in FIG. 12 the valve assembly 24 is in a position corresponding to the position illustrated in FIG. 8 and that of FIG. 15 when the valve assembly 24' is shifted to the left so that the position 332 is aligned with the various ports and passageways.

From the foregoing, it will be apparent that the present invention not only provides a latch valve for high pressure systems that can be operated by a solenoid adapted to exert small forces in the neighborhood of several pounds, but also provides a valve that can be readily and simply modified to operate as either a two-position or a three-position valve.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a pilot operated hydraulic valve, a valve assembly, a hydraulic cylinder for actuating said valve assembly, and a latch mechanism for controlling said hydraulic cylinder, said latch mechanism comprising valve means shiftable from a first position wherein it communicates said hydraulic cylinder with a source of pressurized fluid and a second position wherein it communicates said hydraulic cylinder with tank, means for continuously shifting said valve means back and forth between said first and second positions, and latch means for releasably latching said valve means each time it moves from one position to the other.

2. In a pilot operated hydraulic valve, a valve assembly, a hydraulic cylinder for actuating said valve assembly, and a latch mechanism for controlling said hydraulic cylinder, said latch mechanism comprising valve means shiftable from a first position wherein it communicates said hydraulic cylinder with a source of pressurized fluid and a second position wherein it communicates said hydraulic cylinder with tank, mechanical means for shifting said valve means between said first and second positions, hydraulic means operable in response to the shifting of said valve assembly for actuating said mechanical means in a manner to continuously shift said valve means back and forth between said first and second positions, and latch means for releasably latching said valve means each time it moves from one position to the other.

3. In a pilot operated hydraulic device, a latch mechanism for controlling the operation of said device comprising valve means shiftable from a first position wherein it communicates said device with a source of pressurized fluid to shift the device in one direction and a second position wherein it communicates the device with tank to enable it to be shifted in the opposite direction, means for continuously shifting said valve means back and forth between said first and second positions, and latch means for releasably latching said valve means each time it moves from one position to the other.

4. In a pilot operated hydraulic valve shifted by a hydraulic cylinder, a latch mechanism for controlling the hydraulic cylinder comprising a seal seat assembly shiftable from a first position wherein it communicates the hydraulic cylinder with a source of pressurized fluid and a second position wherein it communicates the hydraulic cylinder with tank, mechanical means for shifting said seal seat assembly between said first and second positions, hydraulic means for actuating said mechanical means to continuously shift the seal seat assembly between said positions, and latch means for releasably latching said seal seat assembly each time it moves from one position to the other.

5. In a pilot operated hydraulic valve shifted by a hydraulic cylinder, a latch mechanism for controlling the hydraulic cylinder comprising a seal seat assembly shiftable from a first position wherein it communicates the hydraulic cylinder with a source of pressurized fluid and a second position wherein it communicates the hydraulic cylinder with tank, an arm pivotally mounted on said latch mechanism and engaging said seal seat assembly to shift it between said first and second positions, a first hydraulic piston means engaging said arm for shifting it in one direction, a second hydraulic piston means engaging said arm between the first hydraulic piston means and the axis of pivot of said arm to pivot the arm in the other direction, and a latch assembly for releasably latching said arm each time it moves said seal seat assembly from one position to the other.

6. The invention as defined in claim 5 including means for continuously communicating said second hydraulic piston means with a source of pressurized fluid, and means for alternately communicating said hydraulic piston means with said source of pressurized fluid or with tank to continuously pivot said arm back and forth to shift said seal seat assembly between said first and second positions, and wherein said latch assembly releasably latches said arm against movement each time it shifts the seal seat assembly between said first and second positions.

7. The invention as defined in claim 5 wherein said latch assembly comprises a member pivotally mounted on said latch mechanism, an upper and lower latch element pivotally mounted on said member, limiting means for limiting relative pivotal movement of said latch elements away from one another, resilient means for resiliently biasing said latch elements against said limiting means, and solenoid operated means for pivoting said member from a position wherein the lower latch element engages the pivoting end of said arm to latch the arm against movement in one direction when said seal seat assembly is in said first position to another position wherein the upper latch element automatically latches the pivoting end of said arm after it has completely shifted said seal seat assembly to said second position and started to move in the reverse direction.

8. In a pilot operated hydraulic valve shifted by a hydraulic cylinder, a latch mechanism for controlling the hydraulic cylinder, said latch mechanism having a pair of parallel spaced-apart surfaces with one of said surfaces having first and second passageways opening thereon in closely spaced relation, said first passageway communicating with a source of pressurized fluid and said second passageway being adapted to communicate with the hydraulic cylinder, a seal seat assembly slidably disposed between and sealing against said surfaces and shiftable from a first position wherein it communicates said passageways with one another and a second position wherein it seals off said first passageway and exposes said second passageway to the body of the valve which is adapted to be communicated with tank, means for continuously shifting said seal seat assembly back and forth between said first and second positions, and latch means for releasably latching said shifting means each time said seal seat assembly is moved from one position to the other.

9. In a pilot operated hydraulic valve shifted by a hydraulic cylinder, a latch mechanism for controlling said hydraulic cylinder having a pair of parallel spaced-apart surfaces, one of said surfaces having first and second passageways opening thereon in closely spaced relation, means for communicating said first passageway with a source of pressurized fluid, means for communicating said second passageway with said hydraulic cylinder, a seal seat assembly slidably disposed between said surfaces and shiftable from a first position wherein it communicates said passageways with one another and a second position wherein it seals off said first passageway and exposes said second passageway to the body of the valve which communicates with tank, an arm pivotally mounted on said latch mechanism and engaging said seal seat assembly for shifting it between said first and second positions, a first hydraulic piston means engaging said arm for pivoting it in one direction, a second hydraulic piston means engaging said arm between said first hydraulic piston means and the axis about which said arm pivots to pivot the arm in the other direction, means for continuously communicating said second hydraulic piston means with the source of pressurized fluid, means for alternately communicating said first hydraulic piston means with the source of pressurized fluid and with tank, and a latch assembly for latching said arm against pivotal movement each time it has moved said seal seat means from one position to the other.

10. A pilot operated hydraulic valve comprising a body having an enlarged chamber therein adapted to be communicated directly with tank, a plate in said body having two cylinder ports with a pressure port therebetween opening on one surface thereof, a sliding block assembly having a wall projecting therefrom and slidably sealing against said surface, said sliding block assembly being shiftable from a first position wherein said wall encloses one of said cylinder ports and said pressure port while the other of said cylinder ports lies outside of the wall and communicates with said chamber, and a second position wherein said wall encloses said other cylinder port and said pressure port and said one cylinder port lies outside the wall and communicates with the chamber, hydraulic cylinder means for shifting said sliding block assembly between said positions, a hydraulically operated latch mechanism for controlling said hydraulic cylinder means, said plate having a small passageway opening on said surface in a predetermined position so as to lie within said wall and communicate with said pressure port when the sliding block is in said one position and to lie beyond said wall and communicate with said chamber when the sliding block assembly is in said second position, and means for communicating said passageway with said latch mechanism for controlling the operation thereof.

11. In a pilot operated hydraulic valve shifted by a hydraulic cylinder, a body having an enlarged chamber therein adapted to communicate directly with tank, a plate in said body having two cylinder ports and a pressure port therebetween opening on one surface thereof, a sliding block assembly having a coined wall projecting therefrom and slidably sealing against said surface, said wall having a rectangular configuration with a lateral offset portion in one of the longitudinally extending sides thereof, said sliding block assembly being shiftable longitudinally from a first position wherein said wall encloses one of said cylinder ports and said pressure port to a second position wherein said wall encloses the other of said cylinder ports and said pressure port, and a small passageway opening on said surface along the longitudinal path of movement of said lateral offset portion of the wall so as to lie within the wall when the sliding block assembly is in said one position and to lie outside of the wall when said sliding block assembly is in said second position.

12. In a pilot operated hydraulic valve, a valve body having an enlarged chamber therein adapted to be communicated directly with tank, a valve assembly in said body shiftable between a first and second position, said valve assembly communicating a first cylinder port with a pressure port and communicating a second cylinder port with said chamber when in said first position and when in said second position communicating the second cylinder port with the pressure port while communicating the first cylinder port with the chamber, a hydraulic cylinder for shifting said valve assembly between said first and second positions, a latch mechanism for controlling said hydraulic cylinder comprising a valve means shiftable from a first position wherein it communicates the hydraulic cylinder with said pressure port and a second position wherein it communicates the hydraulic cylinder with said chamber, mechanical means for shifting said valve means between said first and second positions, hydraulic means for actuating said mechanical means to continuously shift said valve means between said positions, and latch means for releasably latching said valve means each time it moves from one position to the other, said hydraulic means including and being controlled by a small passageway in said valve assembly which communicates with said pressure port when the valve assembly is in its first position and communicates with said chamber when the valve assembly is in its second position.

13. In a pilot operated hydraulic valve, a valve body having an enlarged chamber therein adapted to be communicated directly with tank, a valve assembly in said body shiftable between a first and second position, said valve assembly communicating a first cylinder port with a pressure port and communicating a second cylinder port with said chamber when in said first position and when in said second position communicating the second cylinder port with the pressure port while communicating the first cylinder port with the chamber, a hydraulic cylinder for shifting said valve assembly between said first and second positions, a latch mechanism for controlling the hydraulic cylinder comprising valve means shiftable from a first position wherein it communicates the hydraulic cylinder with said pressure port and a second position wherein it communicates the hydraulic cylinder with said chamber, an arm pivotally mounted on said latch mechanism and engaging said valve means to shift it between said first and second positions, a first hydraulic piston means engaging said arm for shifting it in one direction, a second hydraulic piston means engaging said arm between the first hydraulic piston means and the axis of pivot of said arm for pivoting the arm in the other direction, said valve assembly including a passageway which communicates with said pressure port when the valve assembly is in said first position and communicates with said chamber when the valve assembly is in said second position, means for continuously communicating said second hydraulic piston means with said pressure port, means for communicating said second hydraulic piston means with said passageway, a latch assembly for releasably latching said arm each time it moves said seal seat assembly from one position to the other, and electric solenoid operated means for releasing said latch assembly.

14. In a pilot operated hydraulic valve, a valve body having an enlarged chamber therein adapted to be communicated directly with tank, a valve assembly in said body shiftable between a first and second position, said valve assembly communicating a first cylinder port with a pressure port and communicating a second cylinder port with said chamber when in said first position and when in said second position communicating the second cylinder port with the pressure port while communicating the first cylinder port with the chamber, a hydraulic cylinder for shifting said valve assembly between said first and second positions, a latch mechanism for controlling said hydraulic cylinder and having a pair of parallel spaced-apart surfaces, one of said surfaces having first and second passageways opening thereon in closely spaced relation, means for communicating said first passageway with said pressure port, means for communicating said second passageway with said hydraulic cylinder, a seal seat assembly slidably disposed between said surfaces and shiftable from a first position wherein it communicates said passageways with one another and a second position wherein it seals off said first passageway and exposes said second passageway to said chamber, an arm pivotally mounted on said latch means and engaging said seal seat assembly for shifting it between said first and second positions, a first hydraulic piston means engaging said arm for pivoting it in one direction, a second hydraulic piston means engaging said arm between said first hydraulic piston means and the axis about which said arm pivots for pivoting the arm in the other direction, means for continuously communicating said second hydraulic piston means with said pressure port, passageway means for communicating said first hydraulic piston means with said pressure port when the valve assembly is in its first position and communicating the first hydraulic piston means with said chamber when the valve assembly is in its second position, a latch assembly for automatically latching said arm against pivotal movement each time it has moved said seal seat means from one position to the other, and solenoid operated means for releasing said latch assembly and moving it into position to automatically latch said arm again after the arm has shifted the seal seat assembly to its other position.

15. In a pilot operated hydraulic valve, a body having an enlarged chamber therein adapted to be communicated directly with tank, a ported plate in said body having two cylinder ports with a pressure port therebetween opening on one surface thereof, a sliding block assembly having a wall projecting therefrom and slidably sealing against said surface, said sliding block assembly being shiftable from a first position wherein said wall encloses one of said cylinder ports and said pressure port while the other of said cylinder ports lies outside the wall and communicates with said chamber, and a second position wherein said wall encloses said other cylinder port and said pressure port and said one cylinder port lies outside the wall and communicates with the chamber, a hydraulic cylinder for actuating said sliding block assembly, a latch mechanism for controlling said hydraulic cylinder and having a pair of parallel spaced-apart surfaces, one of said surfaces having first and second passageways opening thereon in closely spaced relation, means for communicating said first passageway with said pressure port, means for communicating said second passageway with said hydraulic cylinder, a seal seat assembly slidably disposed between said surfaces and shiftable from a first position wherein it communicates said passageways with one another and a second position wherein it seals off said first passageway and exposes said second passageway to said chamber, an arm pivotally mounted on said latch means and engaging said seal seat assembly for shifting it between said first and second positions, a first hydraulic piston means engaging said arm for pivoting it in one direction, a second hydraulic piston means engaging said arm between said first hydraulic piston means and the axis about which said arm pivots for pivoting the arm in the other direction, means for continuously communicating said second hydraulic piston means with said pressure port, passageway means for communicating said second hydraulic piston means with said pressure port when the valve assembly is in its first position and communicating said first hydraulic piston means with said chamber when the valve assembly is in its second position, a latch assembly for automatically latching said arm against pivotal movement each time it has moved said seal seat means from one position to the other, and solenoid operated means for releasing said latch assembly and moving it into position to automatically latch said arm again after the arm has shifted the seal seat assembly to its other position.

16. In a pilot operated hydraulic valve, a valve body having an enlarged chamber therein adapted to be communicated directly with tank, a valve assembly in said body shiftable between a first and second position, said valve assembly communicating a first cylinder port with a pressure port and communicating a second cylinder port with said chamber when in said first position and when in said second position communicating the second cylinder port with the pressure port while communicating the first cylinder port with the chamber, a first hydraulic cylinder for shifting said valve assembly to said first position, means for communicating said first hydraulic cylinder with said pressure port, a second hydraulic cylinder capable of overcoming said first hydraulic cylinder to shift said valve assembly to said second position, a latch mechanism for controlling said second hydraulic cylinder comprising a seal seat assembly shiftable from a first position wherein it communicates the second hydraulic cylinder with said pressure port and a second position wherein it communicates the second hydraulic cylinder with said chamber, mechanical means for shifting said seal seat assembly between said first and second positions, hydraulic means for actuating said mechanical means to continuously shift the seal seat assembly between said positions, said hydraulic means including a passageway in said valve assembly for controlling the hydraulic means, said passageway communicating with said chamber when the valve assembly is in one of its two positions and communicating with said pressure port when the valve assembly is in the other of its two positions, and latch means for releasably latching said seal seat assembly each time it moves from one position to the other.

17. In a pilot operated hydraulic valve, a valve body having an enlarged chamber therein adapted to be communicated directly with tank, a valve assembly in said body shiftable to a first, second and third position to control the flow of pressurized fluid through a pressure port and first and second cylinder ports, said valve assembly sealing off said first and second cylinder ports and pressure port in said first position, in said second position said valve assembly communicating said first cylinder port with said pressure port and communicating said second cylinder port with said chamber, in said third position said valve assembly communicating said second cylinder port with the pressure port and communicating the first cylinder port with the chamber, a first hydraulic cylinder means for shifting said valve assembly in one direction, a second hydraulic cylinder means for shifting said valve assembly in the opposite direction, said first and second hydraulic cylinder means shifting said valve assembly to said first position when both are pressurized and shifting the valve assembly to said second position when said first hydraulic cylinder means is communicated with said pressure port and said chamber, said first and second hydraulic means shifting the valve assembly to said third position when said first hydraulic cylinder means is communicated with said chamber and said second hydraulic cylinder means is communicated with said pressure port, a first latch mechanism for controlling said first hydraulic cylinder means, a second latch mechanism for controlling said second hydraulic cylinder means, each of said latch mechanisms comprising a seal seat assembly shiftable from a first position wherein it communicates the hydraulic cylinder means associated therewith with said pressure port and a second position wherein it communicates the hydraulic cylinder means with said chamber, mechanical means for shifting said seal seat assembly between said first and second positions, hydraulic means for actuating said mechanical means to continuously shift the seal seat assembly between said positions, said hydraulic means including a passageway in said valve assembly for controlling the hydraulic means, latch means for releasably latching said seal seat assembly each time it moves from one position to the other, the passageway associated with said first latch mechanism communicating with said pressure port when the valve assembly is in said first and second positions and with said chamber when the valve assembly is in said third position and the passageway associated with said second latch mechanism communicating with said pressure port when the valve assembly is in said first and third positions and communicating with said chamber when the valve assembly is in said second position.

References Cited in the file of this patent

UNITED STATES PATENTS

| 2,916,018 | Pabst et al. | Dec. 8, 1959 |

FOREIGN PATENTS

| 495,283 | Great Britain | Nov. 10, 1938 |
| 507,353 | Canada | Nov. 16, 1954 |
| 749,280 | Great Britain | May 23, 1956 |